(12) United States Patent
Altman et al.

(10) Patent No.: US 10,127,946 B2
(45) Date of Patent: Nov. 13, 2018

(54) ELECTRONIC MEDIA DISC STORAGE TRAY COMPONENT

(71) Applicant: JohnsByrne Company, Niles, IL (US)

(72) Inventors: Jason Scott Altman, Los Angeles, CA (US); Hector David Lemos, San Gabriel, CA (US)

(73) Assignee: JohnsByrne Company, Niles, IL (US)

(*) Notice: Subject to any disclaimer, the term of this patent is extended or adjusted under 35 U.S.C. 154(b) by 0 days.

(21) Appl. No.: 15/389,148

(22) Filed: Dec. 22, 2016

(65) Prior Publication Data

US 2017/0178694 A1  Jun. 22, 2017

Related U.S. Application Data

(60) Provisional application No. 62/270,928, filed on Dec. 22, 2015.

(51) Int. Cl.
*B65D 85/57* (2006.01)
*G11B 33/04* (2006.01)
*G11B 33/02* (2006.01)

(52) U.S. Cl.
CPC .......... *G11B 33/025* (2013.01); *G11B 33/045* (2013.01)

(58) Field of Classification Search
CPC ............ G11B 33/0427; G11B 33/0477; G11B 33/045; G11B 33/0444; G11B 33/0438; G11B 33/0433
USPC .............................................. 206/445, 308.1
See application file for complete search history.

(56) References Cited

U.S. PATENT DOCUMENTS

| 5,334,904 | A | 8/1994 | Kramer |
| 5,377,825 | A * | 1/1995 | Sykes ................ G11B 33/045 206/232 |
| 5,743,390 | A | 4/1998 | Pozzoli |
| 6,932,215 | B1 * | 8/2005 | Chang ................ G11B 33/0444 206/303 |
| D570,635 | S | 6/2008 | Pozzoli |
| 7,441,653 | B2 | 10/2008 | LaRoche |
| 7,766,160 | B2 | 8/2010 | Pozzoli |
| 8,662,296 | B2 | 3/2014 | Preece |
| 2001/0037953 | A1 * | 11/2001 | Gelardi ............... G11B 33/045 206/310 |
| 2007/0000803 | A1 | 1/2007 | Gelardi et al. |
| 2007/0193900 | A1 * | 8/2007 | Kirtz .................. G11B 33/0427 206/310 |

(Continued)

FOREIGN PATENT DOCUMENTS

CA   2663441 A1 *  3/2008  ......... G11B 23/0028
EP   95110413.2   11/1995

(Continued)

OTHER PUBLICATIONS http://www.amaray.com/markets/media-packaging/megapack-18-24-dvd-discs.

*Primary Examiner* — J. Gregory Pickett
*Assistant Examiner* — Allan Stevens
(74) *Attorney, Agent, or Firm* — Valauskas Corder LLC

(57) ABSTRACT

Product packaging for electronic media discs including a tray component with hub portions arranged on one or more opposing surfaces of the tray for storage of a plurality of discs. Each tray component includes one or more tab portions for quick and easy assembly and disassembly with other trays such that any number of trays may be interconnected together providing customizable product packing.

16 Claims, 9 Drawing Sheets

(56) References Cited

U.S. PATENT DOCUMENTS

2010/0258460 A1* 10/2010 Gelardi .............. G11B 33/0444
206/308.1
2011/0031141 A1* 2/2011 Lau ...................... G11B 33/045
206/308.1

FOREIGN PATENT DOCUMENTS

GB          2304690 A  *  3/1997  ........... G11B 33/045
WO    WO 2005006336 A1 *  1/2005  ........... G11B 33/045

* cited by examiner

ELECTRONIC MEDIA DISC STORAGE TRAY COMPONENT

CROSS-REFERENCE TO RELATED APPLICATIONS

This application claims the benefit of U.S. Provisional Patent Application Ser. No. 62/270,928 filed Dec. 22, 2015, incorporated by reference.

FIELD OF THE INVENTION

The field of the invention relates generally to product packaging for electronic media discs, otherwise known as optical discs including, for example, Compact Disc (CD), Digital Video Disc (DVD), Blu-ray Disc (BD). More specifically, the invention relates to interconnecting tray components, with each tray capable of storing multiple electronic media discs on both sides of the tray.

BACKGROUND OF THE INVENTION

An electronic media disc 25a, 25b such as a CD, DVD, or BD is generally a flat, thin, round or circular object (see FIG. 13). As shown in FIG. 13, discs include a content area 28 typically located between two non-content areas 26, 27. The content area 28 includes digital data. The first non-content area 26 includes a centrally located spindle hole 29. Certain material components of electronic media discs include what is known as the shiny or reflective layer. This layer is delicate and susceptible to damage such as scratches and fingerprints creating problems with recording and/or retrieving data from the content area 28.

Storage devices protect discs while not in use from damage. A "jewel" case is one commonly known disc storage device that has been used since approximately 1982. However, there are several shortcomings with the jewel case. For example, the case is hinged on two brittle plastic arms, which often break. The teeth of the hub holding the disc are also prone to breaking. Lastly, the jewel case can only store a single disc.

Although storage devices for storing multiple discs have been developed, these devices include trays with cavities generally arranged side by side and at different levels creating thick and bulky packaging, which also requires considerable shelf space including in retail locations. Other storage devices allow discs to only be stored on one side of the tray. Furthermore, current devices for storing multiple discs can only accommodate a limited number of discs.

What is needed is a compact, light-weight, and durable packaging for storing more than one electronic media disc. The invention satisfies this need.

SUMMARY OF THE INVENTION

The invention provides customizable product packaging for electronic media discs comprising a tray component configured to store a plurality of discs. Each tray component is generally a flat, thin, rectangular-shaped object comprising two opposing surfaces.

According to the invention, a tray component comprises hub portions arranged on one surface or opposing surfaces of the tray for storage of a plurality of discs. More specifically, both sides of the tray component may be used to store media discs. For example, two discs may be stored on a tray with each disc secured to a hub portion located on opposing surfaces.

Alternatively, two discs may be stored on the same side of the tray. Yet another embodiment may include two hub portions on one side of the tray for storing two discs and a single hub portion on the opposing surface. Yet another embodiment may include two hub portions on both sides of the tray for storing four discs. In embodiments with two or more hub portions on a side, the hub portions are generally arranged side by side and on the same surface with the coupling elements of one hub portion being of a greater height than the coupling elements of the other hub portion so as to store discs in a stacked, overlapping arrangement. Each hub portion may comprise or consist of two coupling elements to secure the disc.

Although the invention is shown and described with respect to storing a maximum of two discs per side (four total), any number is contemplated. For example, the tray may be sized to store six discs per side (twelve total).

Each tray component includes one or more tab portions for quick and easy assembly and disassembly with other trays such that any number of tray components may be interconnected together providing customizable product packing. As an example, two interconnected trays with one tray including a hub portion on each side and another tray including two hub portions on each side may be desired for storing a total of six discs.

The invention and its attributes and advantages will be further understood and appreciated with reference to the accompanying drawings.

BRIEF DESCRIPTION OF THE DRAWINGS

The present invention can be better understood by reading the following detailed description of certain preferred embodiments, reference being made to the accompanying drawings in which.

DETAILED DESCRIPTION OF EMBODIMENTS

Figure 1:
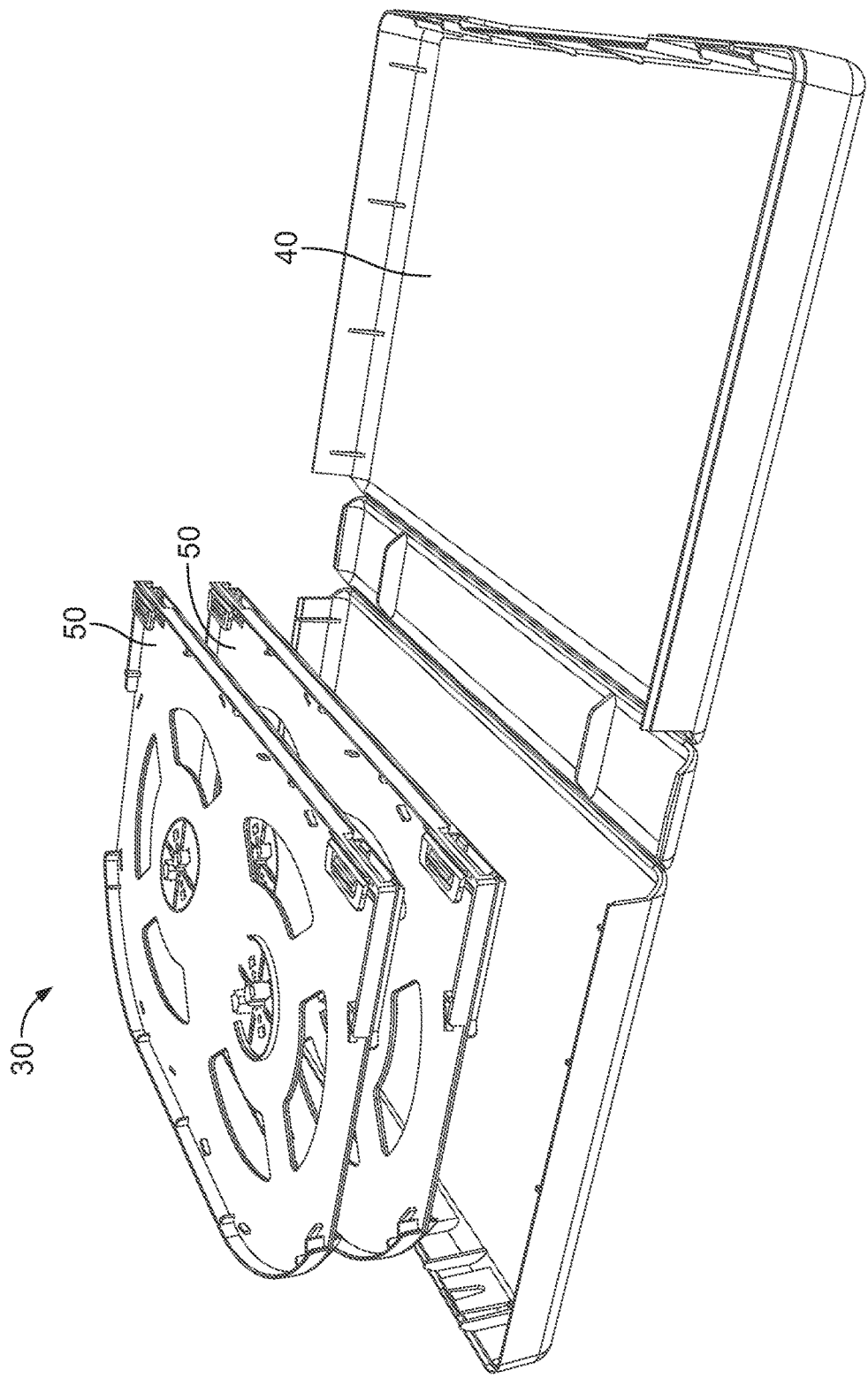
FIG. 1 illustrates an exploded perspective view of a housing assembly including an electronic media disc storage tray component according to the invention.

The invention comprises customizable, interconnectable media disc storage tray components 50. As shown in FIG. 1, a housing assembly 30 includes a housing component 40 and one or more tray components 50.

Figure 2:
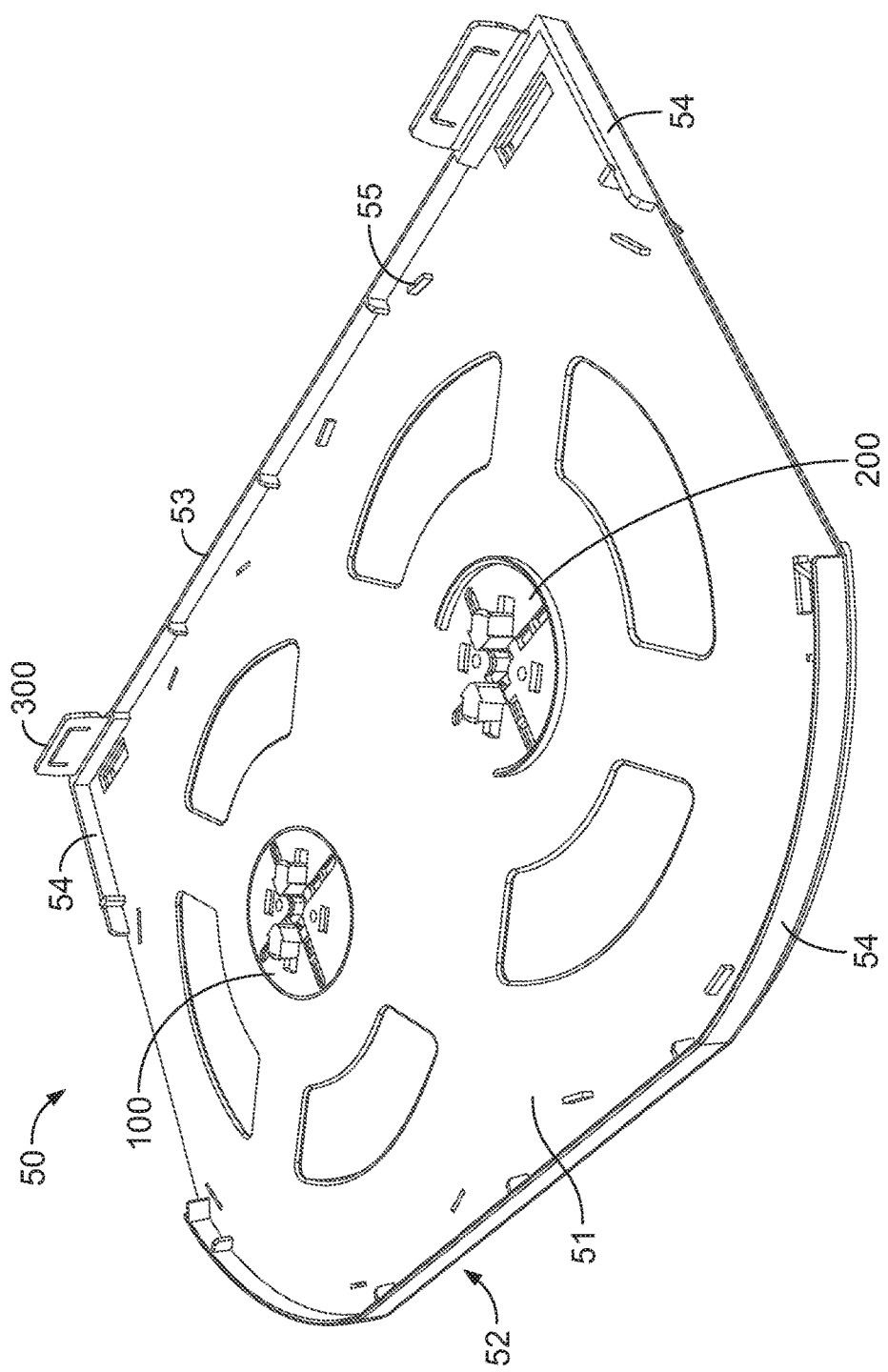
FIG. 2 illustrates a perspective view of an electronic media disc storage tray component according to the invention.
Figure 3:
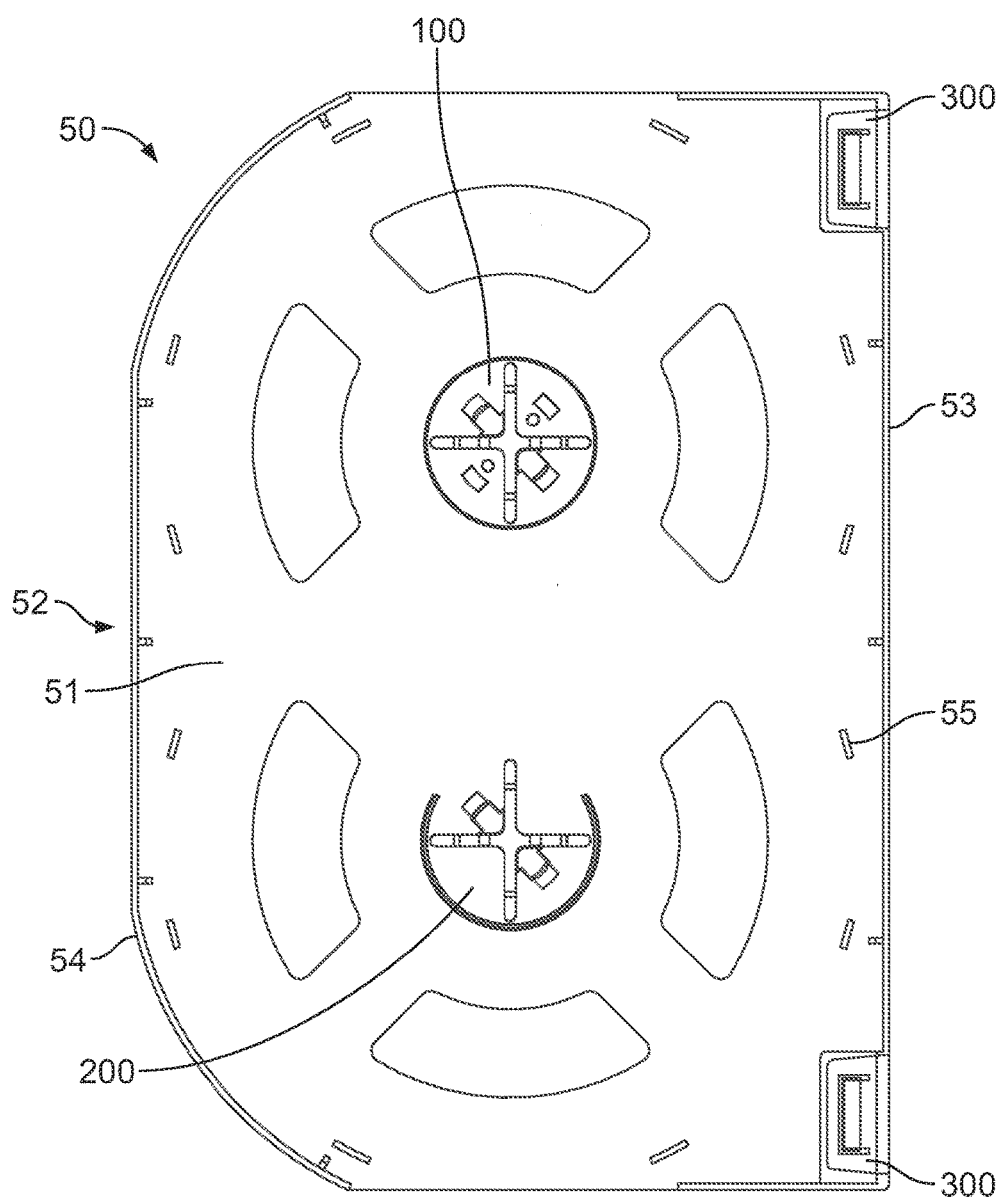
FIG. 3 illustrates a top view of an electronic media disc storage tray component according to the invention.

As shown in FIG. 2 and FIG. 3, tray component 50 comprises a first surface 51 opposing a second surface 52. The perimeter of both the first surface 51 and second surface 52 includes a spine edge element 53 joining a body edge element 54.

First surface 51 includes both a first hub portion 100 and a second hub portion 200 for storing two discs. It is also contemplated that discs may be stored on both surfaces, such as the first surface 51 including a first hub portion 100 and a second hub portion 200 on the first surface 51 and the second surface 52 comprising a first hub portion 100 or both a first hub portion 100 and second hub portion 200.

Figure 8:
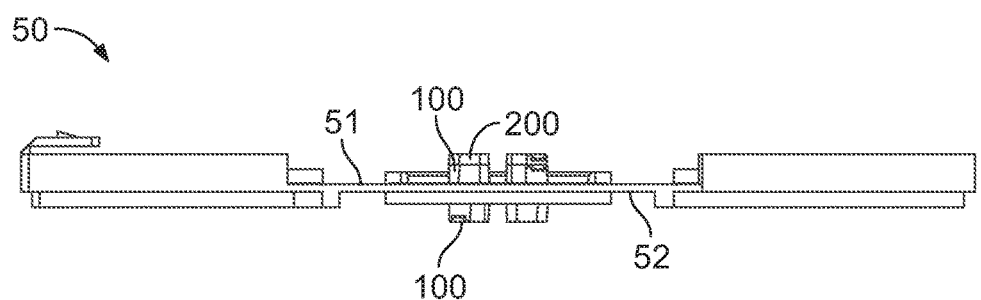
FIG. 8 illustrates a side view of an electronic media disc storage tray component with hub portions on both surfaces according to the invention.

As such, second surface 52 may include either a first hub portion 100—as shown in FIG. 8—for storing an additional disc (three total) or the first hub portion 100 along with a second hub portion 200 for storing an additional two discs (four total).

One or both of the first surface 51 and second surface 52, depending on the number of first hub portions 100 and second hub portions 200 for storing discs, may further include support elements 55 protruding from each of the first surface 51 and second surface 52.

Each tray component 50 further includes one or more tab portions 300 for quick and easy assembly and disassembly with other trays such that any number of trays may be interconnected to provide customizable product packing.

Figure 4:
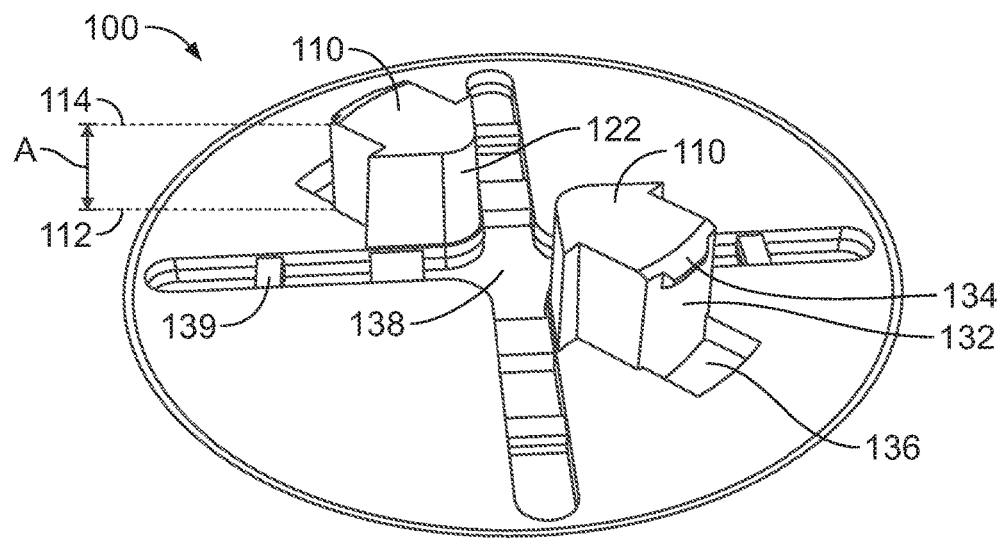
FIG. 4 illustrates a perspective view of a first hub portion according to the invention.
Figure 5:
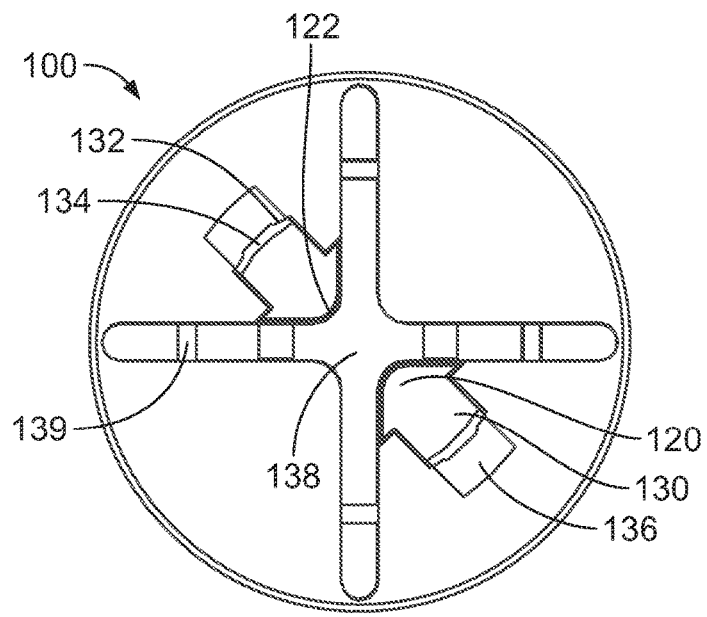
FIG. 5 illustrates a top view of the first hub portion shown in FIG. 4 according to the invention.

Each of the first hub portion 100 and second hub portion 200 includes, respectively, two or more first coupling elements 110 and two or more second coupling elements 210, or teeth, that secure the disc to the tray component 50. First coupling elements 110 of the first hub portion 100 are shown in FIG. 4 and FIG. 5. Each first coupling element 110 of first hub portion 100 includes a bottom surface 112 even or flush with the first surface 51 extending to a top surface 114 defining a height "A".

Each first coupling element 110 is defined by a head section 120 including a front face 122 and a body section 130 including a rear face 132. Head section 120 is generally arrow-shaped and the body section 130 is generally rectangular-shaped. Head section 120 facilitates alignment with the center of the spindle hole of the disc while the rear face 132 substantially abuts the edge of the spindle hole creating a secure engagement between the first coupling elements 110 and disc.

Further securing the engagement between the first coupling elements 110 and disc is a lip element 134. Lip element 134 protrudes from the rear face 132 and is configured to slightly extend over and entrap the disc, preventing it from falling off the first hub portion 100 during movement of the tray component 50.

First hub portion 100 also includes a first slit element 136 and a second slit element 138, each comprising an opening through the first surface 51 and second surface 52. First slit element 136 is generally rectangular-shaped while second slit element 138 is generally cross-shaped. First slit element 136 and second slit element 138 are positioned near the bottom surface 112 of each of the first coupling elements 110. First slit element 136 and second slit element 138 enable each of the first coupling elements 110 to flex or bend facilitating securement of the disc to the first hub portion 100. Second slit element 138 further includes rib elements 139 providing some rigidity to the second slit element 138.

Figure 6:
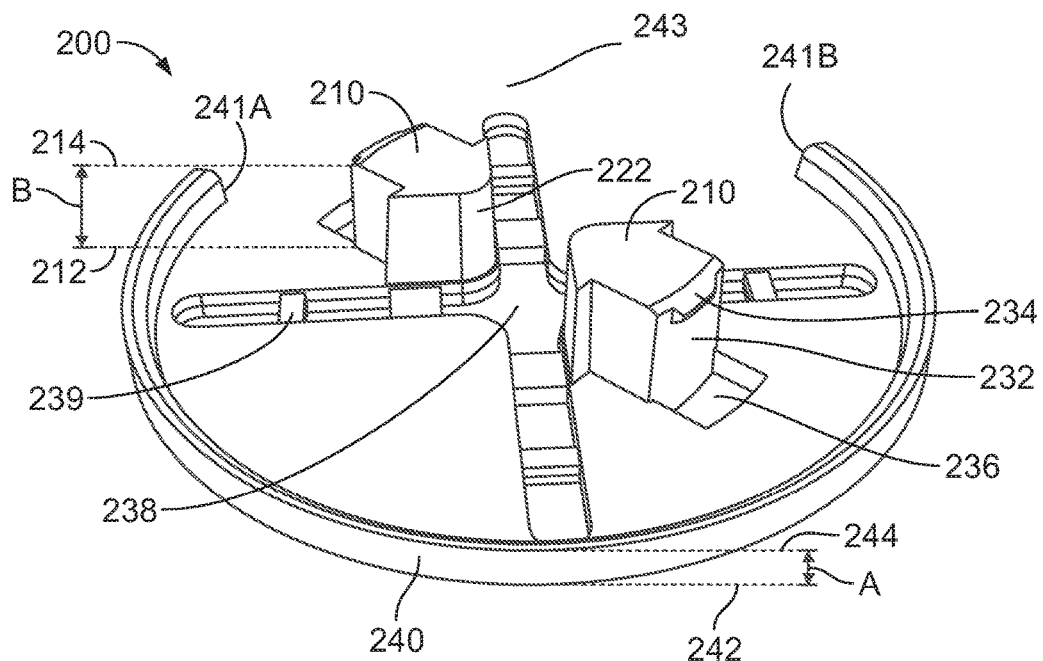
FIG. 6 illustrates a perspective view of a second hub portion according to the invention.
Figure 7:
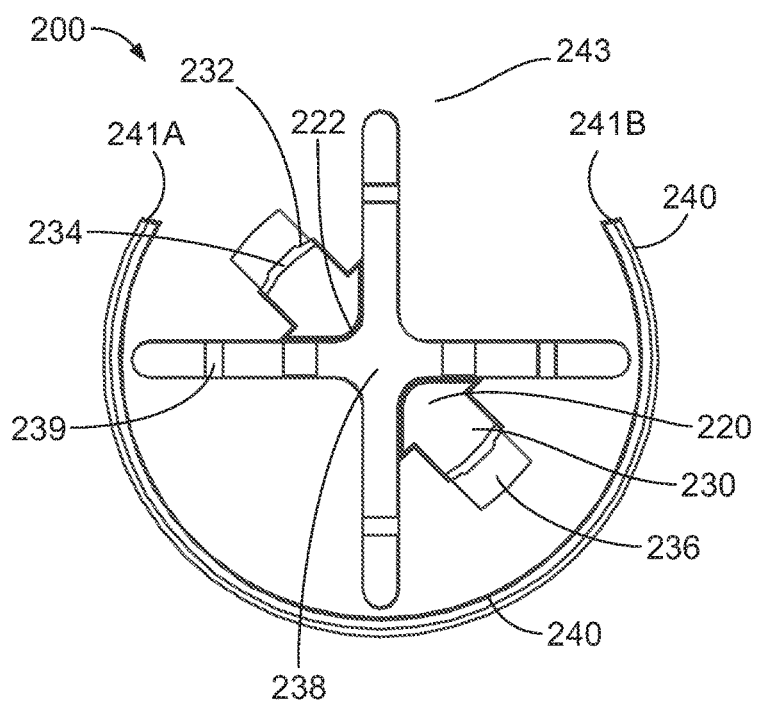
FIG. 7 illustrates a top view of the second hub portion shown in FIG. 6 according to the invention.

FIG. 6 and FIG. 7 illustrate the second hub portion 200. Each second coupling element 210 of second hub portion 200 includes a bottom surface 212 even or flush with first surface 51 extending to a top surface 214 defining a height "B".

Similar to the first coupling elements 110 of the first hub portion 100, each second coupling element 210 is defined by a head section 220 including a front face 222 and a body section 230 including a rear face 232. Head section 220 is generally arrow-shaped and the body section 230 is generally rectangular-shaped. Head section 220 facilitates alignment with the center of the spindle hole of the disc while the rear face 232 substantially abuts the edge of the spindle hole creating a secure engagement between the second coupling elements 210 and disc.

Further securing the engagement between the second coupling elements 210 and disc is a lip element 234. Lip element 234 protrudes from the rear face 232 and is configured to slightly extend over and entrap the disc, preventing it from falling off the second hub portion 200 during movement of the tray component 50.

Second hub portion 200 also includes a third slit element 236 and a fourth slit element 238 comprising an opening through the first surface 51 and second surface 52. Third slit element 236 is generally rectangular-shaped while the fourth slit element 238 is generally cross-shaped. Third slit element 236 and fourth slit element 238 are positioned near the bottom surface 212 of the second coupling elements 210. Third slit element 236 and fourth slit element 238 enable each of the second coupling elements 210 to flex or bend facilitating securement of the disc to the second hub portion 200. Fourth slit element 238 further includes rib elements 239 providing some rigidity to the fourth slit element 238.

Second hub portion 200 further includes a wall element 240 surrounding a portion of the second coupling elements 210. The circular-shaped wall element 240 has a uniform height extending from a first end 241A to a second end 241B. The wall element 240 includes a bottom border 242 even or flush with first surface 51 extending to a top border 244 defining a height "A", which is equal to the height of the first coupling elements 110 of the first hub portion 100.

FIG. 8 illustrates a side view of an electronic media disc storage tray component 50 with a first surface 51 including a first hub portion 100 and a second hub portion 200 and a first hub portion 100 on the second surface 52. A total of three discs may be store on the tray as shown in FIG. 8. However, as mentioned above, any number of hubs on each surface is contemplated.

Figure 9:
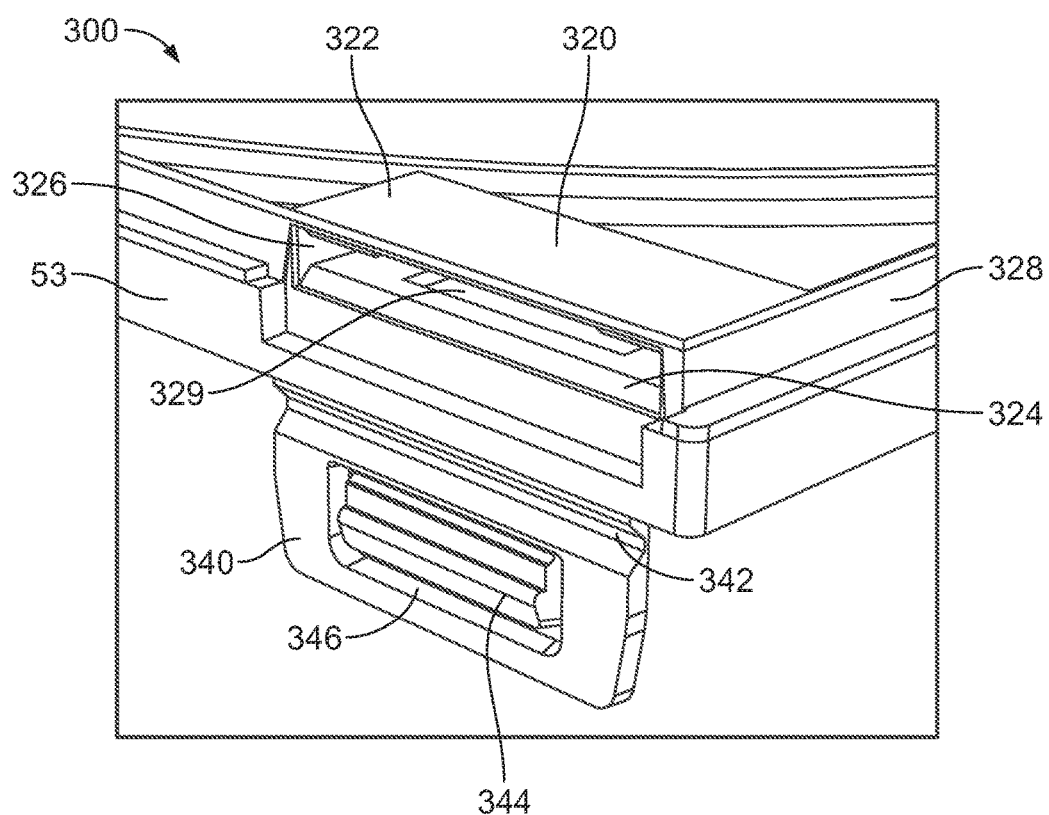
FIG. 9 illustrates a perspective view of a tab portion according to the invention.
Figure 10:
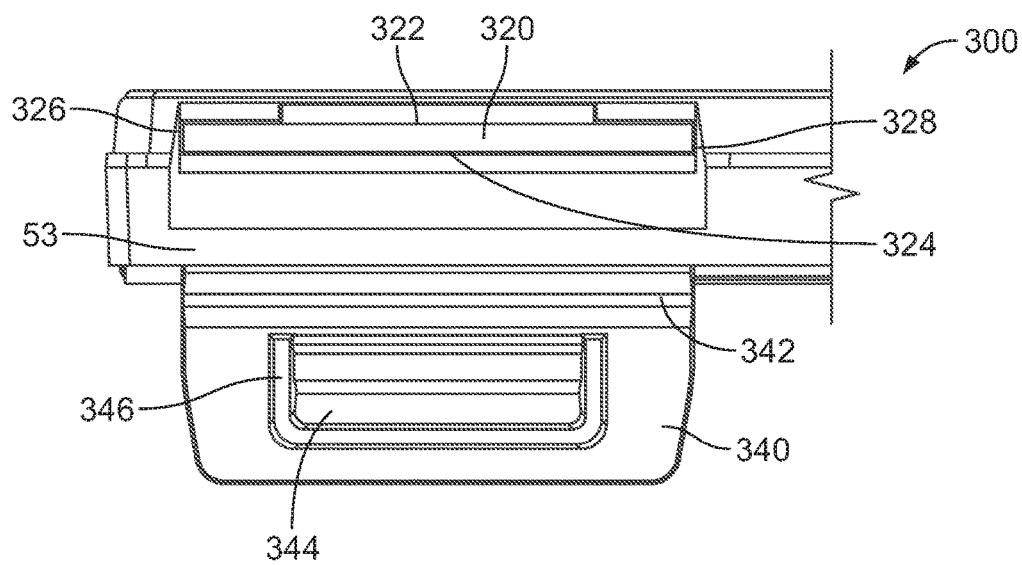
FIG. 10 illustrates a front view of the tab portion shown in FIG. 9 according to the invention.
Figure 11:
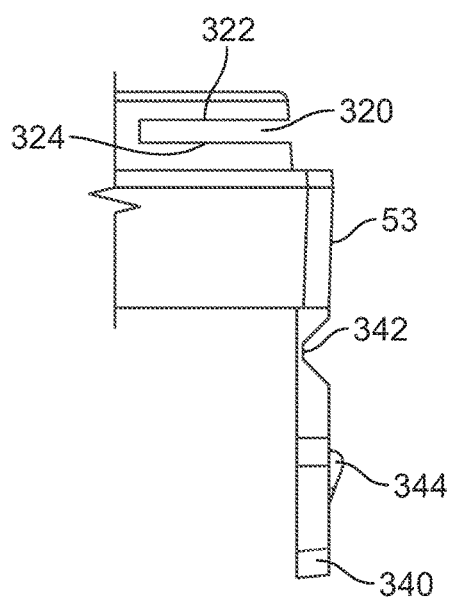
FIG. 11 illustrates a side view of the tab portion shown in FIG. 9 according to the invention.

FIG. 9, FIG. 10, and FIG. 11 illustrate a tab portion 300 according to the invention. Tab portion 300 includes a receptacle component 320 and a flap component 340. Receptacle component 320 is sized and shaped to receive flap component 340 of a tray component 50. More particularly, receptacle component 320 is defined by four wall sections: top wall section 322, bottom wall section 324, first side wall section 326 and second side wall section 328. Bottom wall section 324 includes a cavity element 329 into which a portion of the flap component 340 engages when interconnecting trays.

Figure 12:
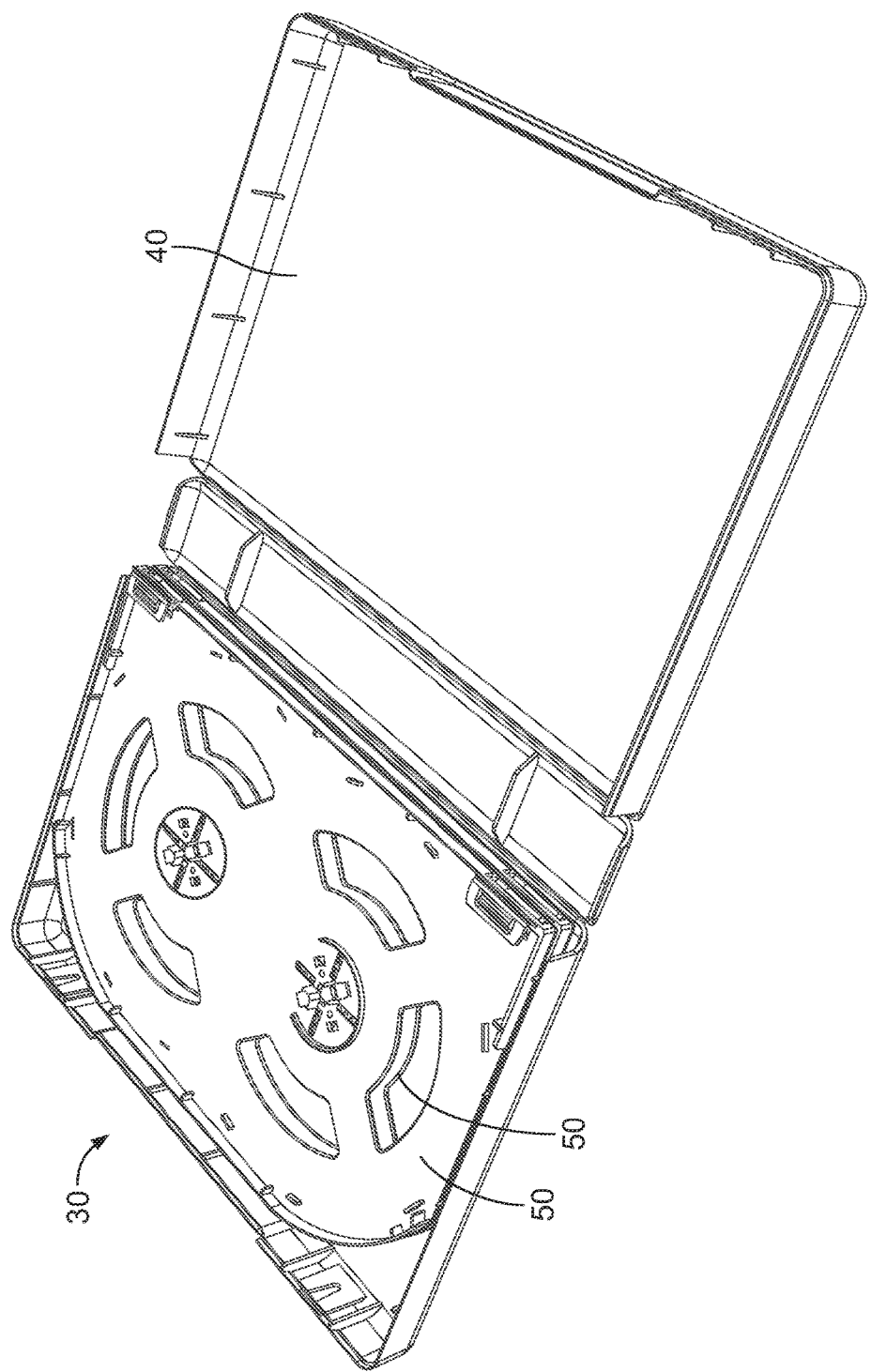
FIG. 12 illustrates a perspective view of a housing assembly including interconnected tray components according to the invention.

Flap element 340 is hingedly attached to spine edge element 53 via groove element 342. Flap element 340 includes a centrally positioned lobe element 344 formed by channel element 346 extending along three sides of the lobe element 344. When interconnecting two or more tray components 50, the flap element 340 of a first tray is hingedly movable about groove element 342 for positioning within the receptacle component 320 of a second tray. When securely fastened, lobe element 344 of a first tray engages cavity element 329 of a second tray. FIG. 12 illustrates a perspective view of a housing assembly including interconnected tray components according to the invention.

Figure 13:
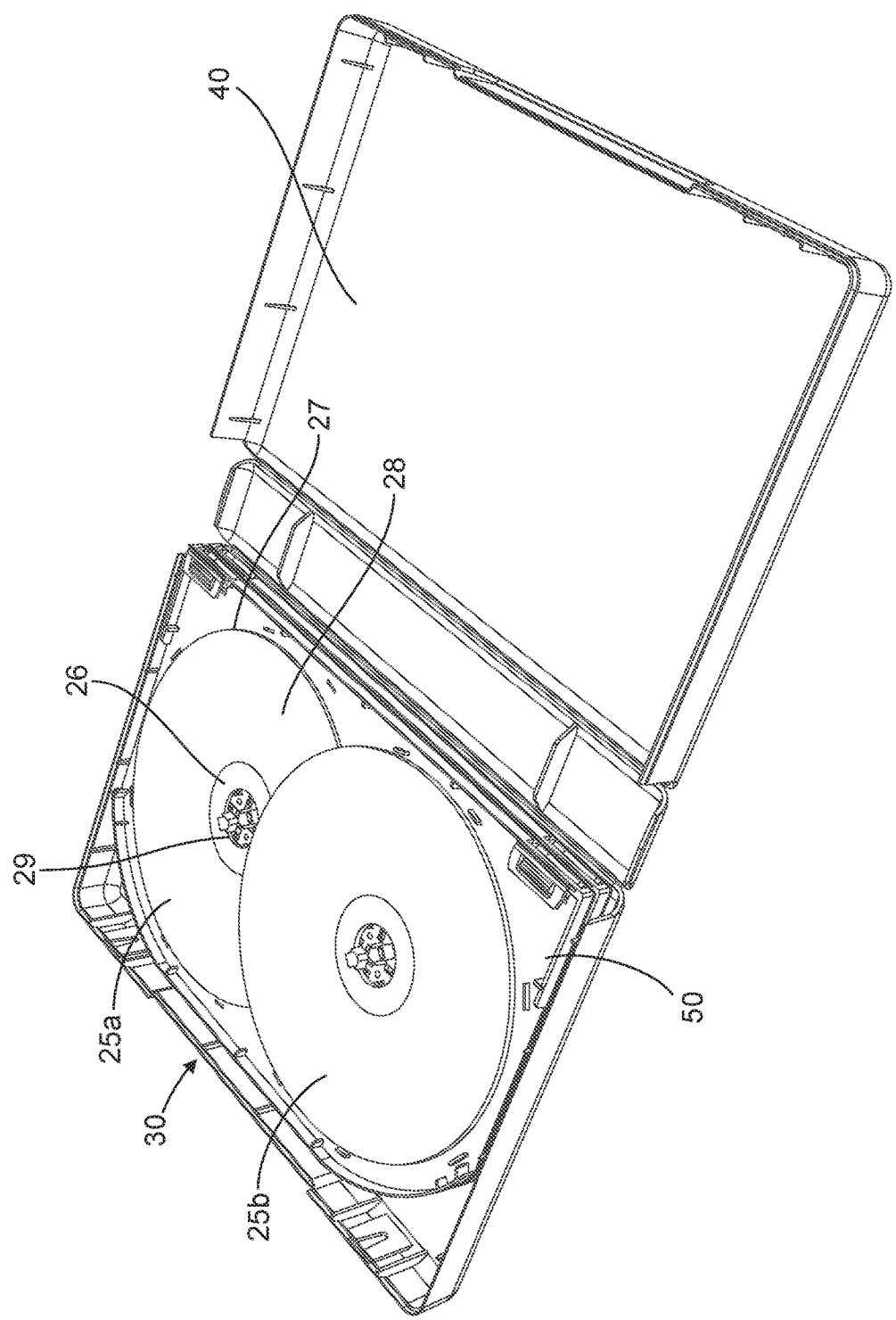
FIG. 13 illustrates a perspective view of a housing assembly including an electronic media disc storage tray component storing two discs according to the invention.

FIG. 13 illustrates a perspective view of a housing assembly 30 including a housing component 40 and an electronic media disc storage tray component 50 storing two discs 25a, 25b according to the invention. A first disc 25a is secured to the first hub portion 100 and a second disc 25b is secured to the second hub portion 200.

With reference to FIG. 2 and FIG. 13, in an exemplary embodiment of the invention, the first disc 25a is secured to the first coupling elements 110 of the first hub portion 100. Once assembled, the first disc 25a substantially abuts first surface 51. The second disc 25b is secured to second coupling elements 210 of the second hub portion 200. Once assembled, the second disc 25b substantially abuts wall element 240 of the second hub portion 200 as well as support elements 55, which further ensure the second disc 25b does not interfere with the first disc 25a stored underneath it. It is noted that the circular-shaped wall element 240 has a uniform height extending from a first end 241A to a second end 241B with the missing portion, or gap 243, between the first end 241A and the second end 241B accommodating the first disc 25a.

More specifically, once secured to the second hub portion 200, the second disc 25b is stacked, overlapping the first disc 25a secured to the first hub portion 100. It is noted that wall element 240 and support elements 55 are positioned on the first surface 51 such that they rest against the non-content areas 26, 27, respectively.

Height "B" of the second coupling elements 210 of the second hub portion 200 is greater than height "A" of the first coupling elements 110 of the first hub portion 100 allowing clearance between first disc 25a and second disc 25b. Wall element 240 and support elements 55 are each of height "A" further ensuring clearance between the first disc 25a and second disc 25b.

While this disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A tray for storing electronic media discs in a stacked, overlapping arrangement on both sides of the tray, the tray comprising:
  a first surface opposing a second surface;
  a first hub portion positioned on the first surface and a second first hub portion positioned on the second surface, each first hub portion including two first coupling elements;
  a second hub portion positioned on the first surface, the second hub portion including two second coupling elements and a circular-shaped wall element having a uniform height extending from a first end to a second end, the circular-shaped wall element surrounding the two second coupling elements, wherein a height of the two second coupling elements is greater than a height of the two first coupling elements of the first hub portion, and the uniform height of the circular-shaped wall element equals the height of the two first coupling elements of the first hub portion;
  a plurality of support elements positioned on the first surface near and around the second hub portion, wherein a height of each support element is equal to the height of the two first coupling elements of the first hub portion positioned on the first surface;
  at least one rectangular-shaped first slit element, each rectangular-shaped first slit element positioned near a bottom surface of a respective one of the two first coupling elements of the first hub portion positioned on the first surface, each rectangular-shaped first slit element positioned near a bottom surface of a respective one of the two first coupling elements of the second first hub portion positioned on the second surface, and at least one rectangular-shaped third slit element positioned near a bottom surface of a respective one of the two second coupling elements of the second hub portion positioned on the first surface;
  at least one cross-shaped second slit element, each cross-shaped second slit element positioned near the bottom surface of the two first coupling elements of the first hub portion positioned on the first surface, the cross-shaped second slit element positioned near the bottom surface of the two first coupling elements of the second first hub portion positioned on the second surface, and a cross-shaped fourth slit element positioned near the bottom surface of the two second coupling elements of the second hub portion positioned on the first surface,
  the first hub portion positioned on the first surface configured to securely receive a spindle hole of a first disc such that a portion of the first disc is located within a gap between the first end and the second end of the circular-shaped wall element,
  the second hub portion positioned on the first surface configured to securely receive a spindle hole of a second disc such that non-content areas of the second disc rest upon the circular-shaped wall element and the plurality of support elements, and
  the first hub portion positioned on the second surface configured to securely receive a spindle hole of a third disc.

2. The tray according to claim 1 further comprising a tab portion including a receptacle component and a flap element.

3. The tray according to claim 2, wherein the receptacle component is defined by top wall section, a bottom wall section, a first side wall section and a second side wall section and configured to receive a flap element of another tray.

4. The tray according to claim 2, wherein the flap element is hingedly attached to the tray via a groove element.

5. The tray according to claim 2, wherein the flap element includes a centrally positioned lobe element formed by channel element extending along three sides of the lobe element.

6. The tray according to claim 5, wherein the receptacle component further comprises a cavity element for receiving the lobe element.

7. The tray according to claim 1, wherein each coupling element includes an arrow-shaped head portion.

8. The tray according to claim 1, wherein each coupling element includes a rectangular-shaped body portion.

9. The tray according to claim 1, wherein each coupling element includes a lip element extending over a rear face of the coupling element.

10. The tray according to claim 1, wherein each first hub portion consists of two first coupling elements.

11. The tray according to claim 1, wherein the second hub portion consists of two second coupling elements.

12. The tray according to claim 1, wherein the second surface further comprises a second hub portion.

13. A tray for storing electronic media discs, comprising:
a first surface opposing a second surface;
two first hub portions each consisting of two first coupling elements, one of the two first hub portions positioned on the first surface and another of the two first hub portions positioned on the second surface;
two second hub portions each consisting of two second coupling elements, one of the two second hub portions positioned on the first surface and another of the two second hub portions positioned on the second surface;
a first circular-shaped wall element positioned on the first surface and a second circular-shaped wall element positioned on the second surface, each circular-shaped wall element having a uniform height extending from a first end to a second end and respectively surrounding two second coupling elements, wherein a height of the second coupling elements is greater than a height of the first coupling elements, and the uniform height of the circular-shaped wall element equals the height of the first coupling elements;
at least one rectangular-shaped first slit element, each rectangular-shaped first slit element positioned near a bottom surface of a respective one of the two first coupling elements of the first hub portion positioned on the first surface and near a bottom surface of a respective one of the two first coupling elements of the first hub portion positioned on the second surface, at least one rectangular-shaped third slit element, each rectangular-shaped third slit element positioned near a bottom surface of a respective one of the two second coupling elements of the second hub portion positioned on the first surface and near a bottom surface of a respective one of the two second coupling elements of the second hub portion positioned on the second surface; at least one cross-shaped second slit element, each cross-shaped second slit element positioned near the bottom surface of the two first coupling elements of the first hub portion positioned on the first surface and near the bottom surface of the two first coupling elements of the first hub portion positioned on the second surface, a cross-shaped fourth slit element positioned near the bottom surface of the two second coupling elements of the second hub portion positioned on the first surface and near the bottom surface of the two second coupling elements of the second hub portion positioned on the second surface;
a tab portion including a receptacle component and a flap element,
wherein the flap element is hingedly attached to the tray and includes a centrally positioned lobe element,
wherein the receptacle component comprises a cavity element for receiving the lobe element of a flap element of another tray.

14. The tray for storing electronic media discs according to claim 13, wherein each of the first coupling elements and the second coupling elements comprise an arrow-shaped head portion connected to a rectangular-shaped body portion, the rectangular-shaped body portion including a rear face from which a lip element extends.

15. The tray for storing electronic media discs according to claim 13, further comprising a plurality of support elements positioned on the first surface near and around the second hub portion positioned on the first surface, wherein a height of each support element is equal to the height of the first coupling elements.

16. A tray for storing electronic media discs in a stacked, overlapping arrangement on both sides of the tray, the tray comprising:
a first surface opposing a second surface;
a first hub portion positioned on the first surface, the first hub portion consisting of:
two first coupling elements,
a rectangular-shaped first slit element,
a cross-shaped second slit element, both the rectangular-shaped first slit element and the cross-shaped second slit element positioned near a bottom surface of one of the two first coupling elements of the first hub portion positioned on the first surface, the first hub portion configured to securely receive a spindle hole of a first disc; and
a second hub portion positioned on the first surface, the second hub portion consisting of:
two second coupling elements,
a rectangular-shaped third slit element,
a cross-shaped fourth slit element, both the rectangular-shaped third slit element and the cross-shaped fourth slit element positioned near a bottom surface of one of the two second coupling elements of the second hub portion positioned on the first surface,
a circular-shaped wall element, the circular-shaped wall element positioned on the first surface and having a uniform height extending from a first end to a second end and surrounding the two second coupling elements, wherein a height of the two second coupling elements is greater than a height of the two first coupling elements, and the uniform height of the circular-shaped wall element equals the height of the two first coupling elements of the first hub portion, the second hub portion configured to securely receive a spindle hole of a second disc.

* * * * *

UNITED STATES PATENT AND TRADEMARK OFFICE
CERTIFICATE OF CORRECTION

PATENT NO. : 10,127,946 B2  
APPLICATION NO. : 15/389148  
DATED : November 13, 2018  
INVENTOR(S) : Jason Scott Altman et al.

Page 1 of 1

It is certified that error appears in the above-identified patent and that said Letters Patent is hereby corrected as shown below:

In the Claims

Column 6, Line 23, after hub portion positioned on the first surface, replace "the" with --each--.

Signed and Sealed this
First Day of January, 2019

Andrei Iancu
*Director of the United States Patent and Trademark Office*